(12) United States Patent
Chung et al.

(10) Patent No.: US 7,875,668 B2
(45) Date of Patent: Jan. 25, 2011

(54) COMPOSITE SOLID SURFACE ARTICLE CONTAINING LOESS

(75) Inventors: Dong Choon Chung, Yeosu-si (KR); Do Choon Rha, Seoul (KR); Eung Seo Park, Yeosu-si (KR)

(73) Assignee: Cheil Industries Inc., Gumi-si (KR)

( * ) Notice: Subject to any disclaimer, the term of this patent is extended or adjusted under 35 U.S.C. 154(b) by 713 days.

(21) Appl. No.: 11/759,381

(22) Filed: Jun. 7, 2007

(65) Prior Publication Data

US 2007/0232496 A1    Oct. 4, 2007

Related U.S. Application Data

(63) Continuation-in-part of application No. PCT/KR2005/004213, filed on Dec. 9, 2005.

(30) Foreign Application Priority Data

Dec. 9, 2004    (KR) ..................... 10-2004-0103495

(51) Int. Cl.
*C08K 3/34* (2006.01)
*A01N 47/10* (2006.01)
(52) U.S. Cl. .................... 524/445; 524/425; 504/301
(58) Field of Classification Search ................. 524/445, 524/425; 504/301
See application file for complete search history.

(56) References Cited

U.S. PATENT DOCUMENTS 5,280,051 A    1/1994    Traverso et al.

FOREIGN PATENT DOCUMENTS

| JP | 07-242474 | | 9/1995 |
|---|---|---|---|
| JP | 2000-317957 | | 11/2000 |
| JP | 2000317957 A | * | 11/2000 |
| JP | 3123419 B2 | | 1/2001 |
| JP | 2003-103596 | | 4/2003 |
| KR | 100272421 | | 1/2000 |
| KR | 1999-0058643 | | 7/2001 |
| KR | 2004059913 A | * | 7/2004 |

OTHER PUBLICATIONS

International Search Report and Written Opinion for counterpart Application No. PCT/KR2005/004213, mailed on Mar. 23, 2006.

* cited by examiner

*Primary Examiner*—Michael M Bernshteyn
(74) *Attorney, Agent, or Firm*—Summa, Additon & Ashe, P.A.

(57) ABSTRACT

A composition for artificial marble includes (a) about 100 parts by weight of an acrylic resin; (b) about 1 to about 30 parts by weight of an ocher powder having a particle size of about 1 to about 50 μm; (c) about 100 to about 200 parts by weight of an inorganic filler; (d) about 0.1 to about 10 parts by weight of cross-linking agent; and (e) about 0.1 to about 10 parts by weight of a polymerization initiator.

9 Claims, 1 Drawing Sheet

COMPOSITE SOLID SURFACE ARTICLE CONTAINING LOESS

CROSS-REFERENCE TO RELATED APPLICATIONS

This non-provisional application is a continuation-in-part application of PCT Application No. PCT/KR2005/004213, filed Dec. 9, 2005, which designates the U.S. and which is hereby incorporated by reference in its entirety, and claims priority from Korean Patent Application No. 10-2004-0103495, filed Dec. 9, 2004, which is also hereby incorporated by reference in its entirety.

FIELD OF THE INVENTION

The present invention relates to a composition for composite solid surface articles.

BACKGROUND OF THE INVENTION

Artificial marble is widely used as a building material. Artificial marble is typically classified as acrylic artificial marble or unsaturated polyester artificial marble. Acrylic artificial marble is widely used because of its excellent appearance, superior texture and good weatherability, as compared to unsaturated polyester artificial marble. For example, acrylic artificial marble is used as a material for kitchen, bath and other countertops, sinks, dressing tables, bathtubs, wall materials, interior articles, and the like.

Conventionally manufacturers of artificial marbles focus on the production of a natural-stone-like texture. Accordingly, many conventional marbles are only available with stone-like patterns. Further, many conventional artificial marbles are not made with eco-friendly material.

In general, ocher or loess has excellent detoxificant and antibacterial effects. Accordingly ocher or loess is widely used in food, cosmetic materials, cloth, and the like, and many popular products include loess.

Further, ocher or loess can control temperature and humidity. Accordingly, it can also act as an insulator and can provide coolness in the summer and warmth in the winter. It has also been used as a traditional building material in Korea.

Artificial marble including loess could be suitable for use in interior building materials or various interior articles. However, it can be difficult to produce such materials or articles with both good mechanical strength and elegant ocher texture because of the low compatibility of loess or ocher and acrylic matrix resins and the resultant poor processability.

Korean Patent No. 272421 is directed to a method of preparing artificial marble comprising preparing a loess molding layer consisting of a mixture of loess and unsaturated polyester resin, laminating a zeolite surface layer consisting of a mixture of zeolite and unsaturated polyester resin onto the molding layer, and curing the laminated layers. However, this method has poor processability and the resulting artificial marble has poor mechanical strength due to the high content of loess.

SUMMARY OF THE INVENTION

The aspect of the invention provides a composite solid surface article including (a) about 100 parts by weight of an acrylic resin; and (b) about 1 to about 30 parts by weight of ocher or loess powder having a particle size of about 1 to about 50 μm. The composite solid surface article of the invention can further include (c) about 100 to about 200 parts by weight of an inorganic filler; (d) about 0.1 to about 10 parts by weight of a cross-linking agent; and (e) about 0.1 to about 10 parts by weight of a polymerization initiator. In various embodiments the composite solid surface article may also include about 0.1 to about 150 parts by weight of marble chips.

The composite solid surface article of the invention can be eco-friendly and further can have good mechanical strength and unique ocher texture. Further, the composite solid surface article of the invention can have a substantially smooth surface with a viewable pattern formed by one or more ingredients thereof, wherein the viewable pattern includes at least part of the loess or ocher powder. Without being limited by any theory or explanation of the invention, the inventors have found that adding loess to an acrylic artificial composition in specific sizes and amounts can result in a material having these and other desirable properties.

DETAILED DESCRIPTION OF THE INVENTION

Figure 1:
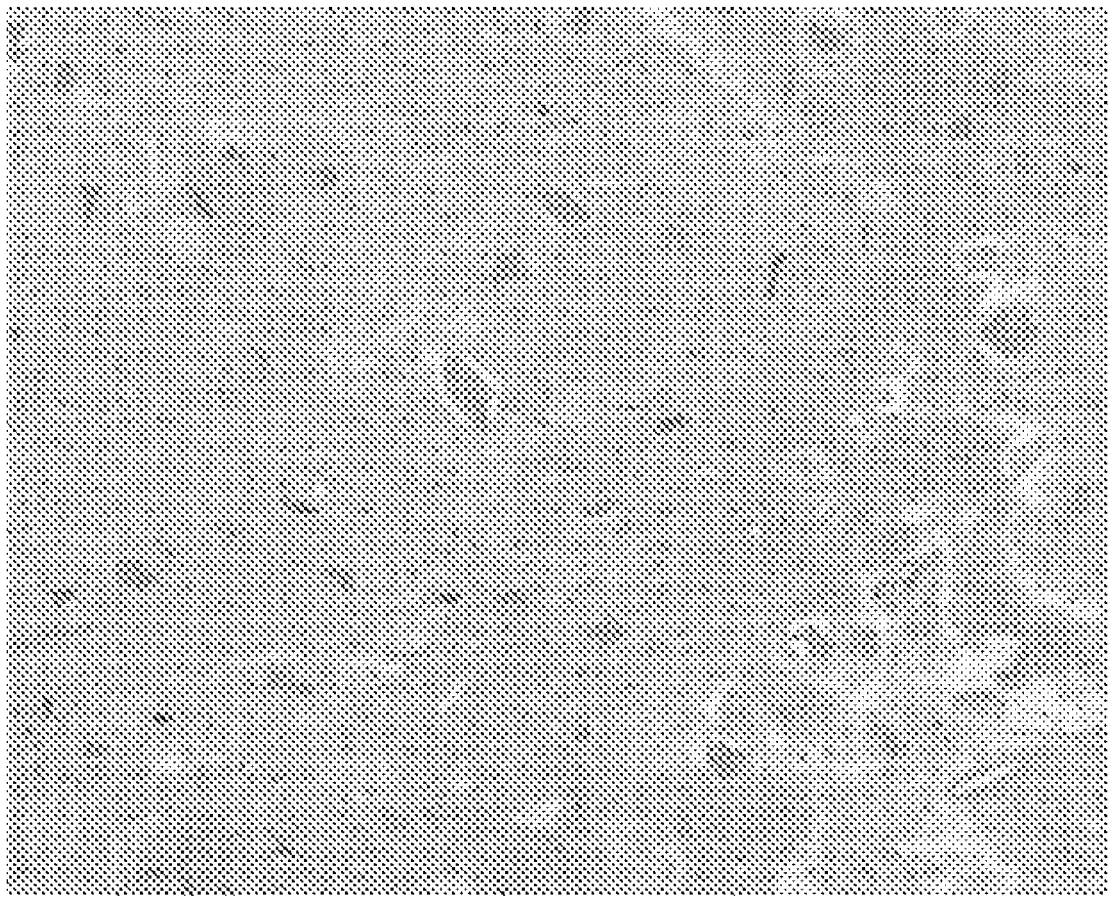
FIG. 1 is a photograph showing a surface pattern of a composite solid surface article obtained in Example 1.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Composite solid surface articles in accordance with the invention can include (a) about 100 parts by weight of an acrylic resin; and (b) about 1 to about 30 parts by weight of ocher or loess powder having a particle size of about 1 to about 50 μm. Composite solid surface articles of the invention can further include (c) about 100 to about 200 parts by weight of an inorganic filler; (d) about 0.1 to about 10 parts by weight of a cross-linking agent; and (e) about 0.1 to about 10 parts by weight of a polymerization initiator.

(a) Acrylic Resin

Exemplary acrylic resins useful in the present invention can include a mixture of one or more polyacrylate and one or more acrylic monomers, for example, in the form of a resin syrup including a mixture of acrylic monomer and its polymer, polyacrylate.

Typical examples of the acrylic monomer can include without limitation methacrylic acid, methacrylic acid esters such as methyl methacrylate, ethyl methacrylate, isopropyl methacrylate, n-butyl methacrylate, 2-ethylhexyl methacrylate, and the like, as well as mixtures thereof.

In exemplary embodiments of the invention, the amount of acrylic monomer can be equal to or more than about 65% by weight and the amount of the polyacrylate can be equal to or less than about 35% by weight, based on total weight of the acrylic resin syrup.

(b) Ocher or Loess Powder

In exemplary embodiments of the invention, the average particle size of the loess powder can range from about 1 to about 50 μm, for example, from about 5 to about 40 μm. Loess powder having an average particle size of about 5 to about 40 μm can provide even higher mechanical properties in the resultant article.

It can be difficult to control the process if the loess powder has a particle size of less than about 1 μm. The use of loess powder having a particle size of more than about 50 μm can reduce the mechanical strength of the composite solid surface article.

According to various exemplary embodiments of the invention, the composite solid surface article can be eco-friendly and may have a unique ocher texture or pattern on at least a portion of a surface thereof, resulting from the use of the loess powder.

The amount of loess powder can range from about 1 to about 30 parts by weight, for example, about 5 to about 25 parts by weight, per 100 parts by weight of acrylic resin.

of the amount of loess powder is more than about 30 parts by weight, the mechanical strength of the composite solid surface article can deteriorate. On the other hand, if the amount of loess powder is less than about 1 part by weight, the composite solid surface article prepared therefrom may not have a unique loessial pattern.

(c) Inorganic Filler

Any inorganic filler well known in the art can be used. Typical examples of the inorganic filler can include calcium carbonate, aluminium hydroxide, silica, alumina, barium sulfate, magnesium hydroxide, and the like, and mixtures thereof. The inorganic filler of the present invention may have a particle size of about 1 to about 100 μm.

Aluminium hydroxide can advantageously impart a transparent and elegant appearance to the artificial marble.

The amount of inorganic filler may range from about 100 to about 200 parts by weight, for example, from about 120 to about 160 parts by weight, per 100 parts by weight of acrylic resin.

(d) Cross-Linking Agent

Exemplary cross-linking agents can include polyfunctional (meth)acrylates. Examples of polyfunctional (meth)acrylates can include ethylene glycol di(meth)acrylate, propylene glycol di(meth)acrylate, glycerol tri(meth)acrylate, trimethylolpropane tri(meth)acrylate, bisphenol A di(meth)acrylate, and the like, and mixtures thereof.

The content of the cross-linking agent may range from about 0.1 to about 10 parts by weight, for example, from about 0.3 to about 10 parts by weight, per 100 parts by weight of acrylic resin.

(e) Polymerization Initiator

Exemplary polymerization initiators may include peroxides such as benzoyl peroxide, lauroyl peroxide, butyl hydroperoxide, cumene hydroperoxide, and the like, and azo compounds such as azobisisobutylonitrile and the like, as well as mixtures thereof.

The amount of polymerization initiator may range from about 0.1 to about 10 parts by weight, per 100 parts by weight of acrylic resin.

(f) Marble Chips

In various embodiments, conventional artificial marble chips with various colors may be optionally added. Typically, such marble chips may have particle sizes from about 0.1 mm to about 5 mm. The marble chips can be prepared using conventional methods. For example, marble chips can be prepared by mixing about 100 parts by weight of acrylic resin, about 120 to about 200 parts by weight of an inorganic filler, about 0.1 to about 10 parts by weight of a cross linking agent and about 0.1 to about 10 parts by weight of an initiator, curing the mixture and pulverizing the cured material.

In various embodiments, such marble chips may have sizes from about 0.1 mm to about 1.0 mm.

The marble chips may be added in an amount of about 0 to about 200 parts by weight, for example, about 0.1 to about 150 parts by weight, for example, about 0.1 to about 70 parts by weight, per 100 parts by weight of acrylic resin to provide an artificial marble with various patterns.

The artificial marble of the present invention can be prepared using conventional methods. For example, all the components and additives can be mixed together to obtain a slurry of artificial marble. Then the slurry can be poured into a molding cell and thereafter cured to form an artificial marble product.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES

Example 1

100 parts by weight of methyl methacrylate resin syrup consisting of a mixture of 30% of poly methyl methacrylate and 70% of methyl methacrylate, 20 parts by weight of loess powder having an average particle size of 30 μm, 155 parts by weight of a mixture consisting of marble chips having particle sizes of 0.1 to 5 mm and aluminium hydroxide, 2 parts by weight of trimethylolpropane tri(meth)acrylate and 2 parts by weight of lauroyl peroxide are mixed, and stirred by a mixer to obtain a mixed slurry. The mixed slurry is poured into a glass molding cell having a size of 300 mm×600 mm×15 mm, and cured in an oven at 45° C., and then the mixed slurry is gradually heated up to 100° C. The cured mixed slurry is cooled to room temperature to obtain a solid surface article in the form of a flat plate. The resulting solid surface article has a unique and refined ocher texture. A photograph of the resultant solid surface article is shown in FIG. 1.

Example 2

Example 2 is prepared in the same manner as in Example 1 except that 10 parts by weight of loess powder having an average particle size of 10 μm is used.

Comparative Example 1

Comparative Example 1 is prepared in the same manner as in Example 1 except that 50 parts by weight of loess powder is used.

Comparative Example 2

Comparative Example 2 is prepared in the same manner as in Example 2 except that loess powder having an average particle size of 80 μm is used.

The flexural strength and impact strength of the solid surface articles of Examples 1-2 and Comparative Examples 1-2 are determined by ASTM 790 and ASTM 256 respectively and are as follows:

TABLE 1

|  | Examples | | Comparative Examples | |
|---|---|---|---|---|
|  | 1 | 2 | 1 | 2 |
| Flexural strength (kgf/cm²) | 680 | 672 | 489 | 320 |
| Izod impact strength (kg · cm/cm) | 1.6 | 1.4 | 0.8 | 1.0 |

As shown in Table 1, Comparative Example 1 demonstrates that using an excessive amount of loess degrades flexural and impact strength. Comparative Example 2 demonstrate that using excessively large particles having a diameter of greater than 50 μm also degrades flexural and impact strength.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A composition for solid surface articles, comprising:
   about 100 parts by weight of an acrylic resin; and
   about 1 to about 30 parts by weight of loess powder having an average particle size of about 1 to about 50 μm.

2. The composition of claim 1, further comprising:
   about 100 to about 200 parts by weight of an inorganic filler;
   about 0.1 to about 10 parts by weight of a cross-linking agent; and
   about 0.1 to about 10 parts by weight of a polymerization initiator.

3. The composition of claim 2, further comprising about 0.1 to about 150 parts by weight of marble chips.

4. The composition of claim 1, wherein the acrylic resin comprises a mixture of one or more polyacrylates and one or more acrylic monomers.

5. The composition of claim 4, wherein said acrylic monomer is selected from the group consisting of methacrylic acid, methyl methacrylate, ethyl methacrylate, i-propyl methacrylate, n-butyl methacrylate, 2-ethylhexyl methacrylate, and mixtures thereof.

6. The composition of claim 2, wherein said inorganic filler is selected from the group consisting of calcium carbonate, aluminium hydroxide, silica, alumina, barium sulfate, magnesium hydroxide, and mixtures thereof.

7. The composition of claim 2, wherein said cross-linking agent is selected from the group consisting of ethylene glycol di(meth)acrylate, propylene glycol di(meth)acrylate, glycerol tri(meth)acrylate, trimethylolpropane tri(meth)acrylate, bisphenol A di(meth)acrylate, and mixtures thereof.

8. The composition of claim 3, wherein said marble chips are prepared by mixing about 100 parts by weight of an acrylic resin, about 100 to about 200 parts by weight of an inorganic filler, about 0.1 to about 10 parts by weight of a cross-linking agent and about 0.1 to about 10 parts by weight of an initiator, curing the mixture to form a cured artificial marble, and then pulverizing the cured artificial marble to a size of about 0.1 to about 5 mm.

9. A composite solid surface article produced by curing the composition of claim 2.

* * * * *